No. 843,117. PATENTED FEB. 5, 1907.
C. G. STREICH.
FRONT GEAR FOR VEHICLES.
APPLICATION FILED FEB. 8, 1906.
2 SHEETS—SHEET 1.
Fig. 1.
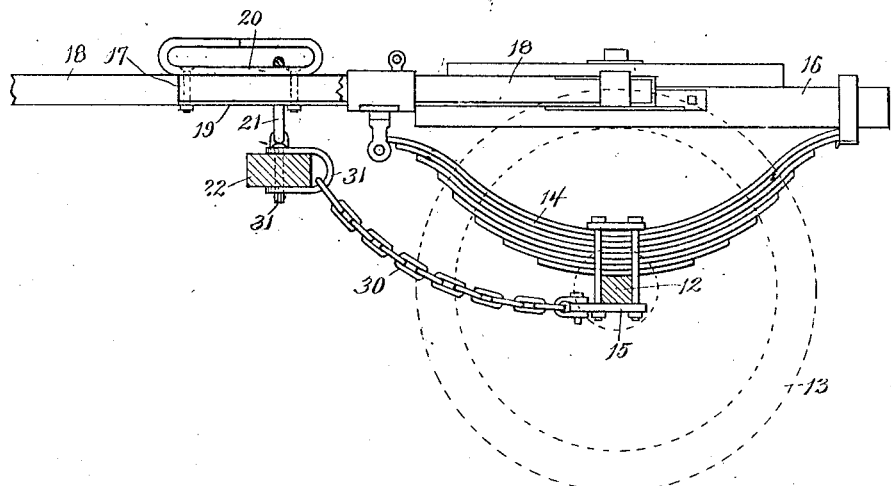
Fig. 2.
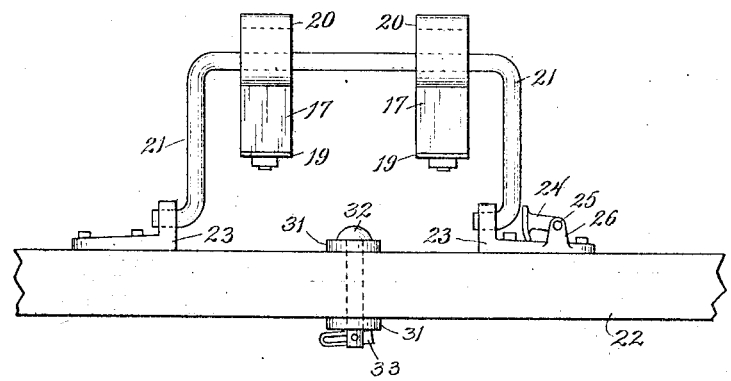
Fig. 3.     Fig. 4.     Fig. 5.
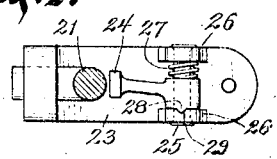 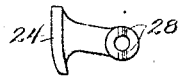
Witnesses:
C. H. Keeney
Anna F. Schmidtbauer
Inventor.
Charles G. Streich.
By Benedict, Morsell & Caldwell
Attorneys No. 843,117. PATENTED FEB. 5, 1907.
C. G. STREICH.
FRONT GEAR FOR VEHICLES.
APPLICATION FILED FEB. 8, 1906.
2 SHEETS—SHEET 2.
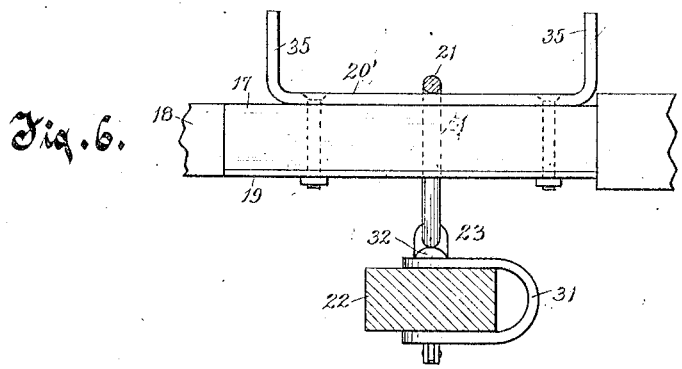
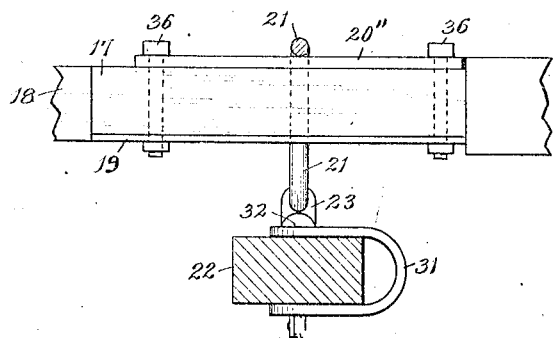
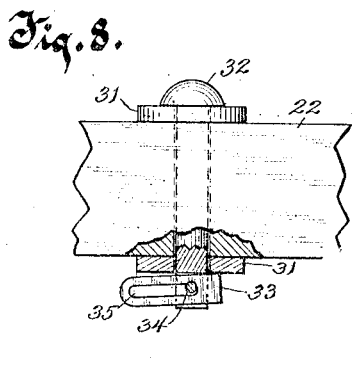
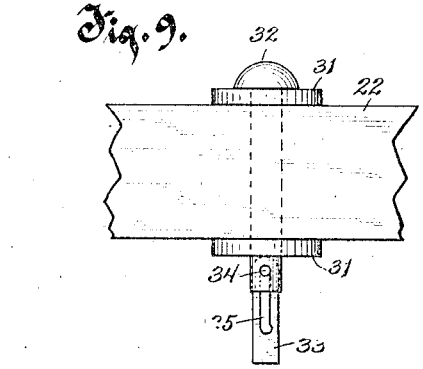
Witnesses.
Inventor.
Charles G. Streich,
By Benedict, Morsell & Caldwell.
Attorneys.

UNITED STATES PATENT OFFICE.

CHARLES G. STREICH, OF OSHKOSH, WISCONSIN.

FRONT GEAR FOR VEHICLES.

No. 843,117.  Specification of Letters Patent.  Patented Feb. 5, 1907.

Application filed February 8, 1906. Serial No. 300,057.

*To all whom it may concern:*

Be it known that I, CHARLES G. STREICH, residing in Oshkosh, in the county of Winnebago and State of Wisconsin, have invented new and useful Improvements in Front Gears for Vehicles, of which the following is a description, reference being had to the accompanying drawings, which are a part of this specification.

This invention relates to front gears for vehicles, and has for its object to provide a draft-evener which will be strong and durable in use and highly efficient in its operation, while permitting of the evener-bar being quickly and easily detached to enable the horses of one vehicle to assist the horses of another vehicle when occasion requires.

With the above and other objects in view the invention consists in the front gear for vehicles herein described and claimed, its parts and combinations of parts, and all equivalents.

Referring to the accompanying drawings, in which like characters of reference indicate the same parts in the several views, Figure 1 is a sectional elevation of a front gear for vehicles constructed in accordance with this invention. Fig. 2 is a front elevation of the hounds and the evener-bar with their connections. Fig. 3 is a plan view of the lock for the hanger of the evener-bar. Fig. 4 is a detail view of the stop member thereof. Fig. 5 is a sectional elevation of the base member thereof. Fig. 6 is a sectional elevation of parts, showing a modified form of bearing for the evener-bar hanger. Fig. 7 is a similar view showing a further modification thereof. Fig. 8 is a sectional elevation of the clevis-bolt for the evener-bar, showing the stop in its normal position; and Fig. 9 is an elevation of the same, showing the stop in position to permit of the removal of the clevis-bolt.

In the drawings, 12 represents the front axle of a vehicle on which the wheels 13 are mounted and to which the springs 14 are clamped in the usual manner by means of the spring-clamp 15, and 16 represents the frame portion of the front gear provided with the forwardly-projecting hounds 17 and the thills 18, as usual.

The hounds are provided on their under surfaces with hound-plates 19, and upon their upper surfaces there are bolted or otherwise clamped bearing-plates 20, which in the preferred construction, as shown in Figs. 1 and 2, comprise elongated horizontal metal loops within which rides the upper horizontal portion of a U-shaped hanger 21 for an evener-bar 22. The upper horizontal portion of the hanger 21 is sufficiently long to permit of longitudinal movement of the hanger through the bearings 20, so as to allow the evener-bar to move lengthwise or transversely of the direction of draft, and it has sufficient vertical play within the loops of the bearings to permit of rocking or tilting of the evener-bar as one end thereof is raised higher than the other. The hanger 21 has both of its ends bent horizontally in the same direction, so that they may both be entered as hooks into eyes or openings in upwardly-extending brackets 23 on the evener-bar by the same movement, both ends entering the brackets from the same side.

In order that the hooked ends of the hanger may not accidentally slip out of their engagement with the brackets 23, one of said brackets is provided with a locking means to be swung into the path of the end of the hanger which engages it and thus prevent its withdrawal. The locking means comprises a stop 24, which is pivotally mounted upon a pin 25 between a pair of upstanding ears 26 on this bracket, the stop being loosely mounted on the pin and being pressed by a coil-spring 27, surrounding the pin so as to force a projecting rib 28 on its hub into a corresponding groove 29 in the ear 26. This engagement takes place both in the closed position of the stop, where it stands in the path of the end of hanger 21, and in the open position thereof, so as to hold the stop in either of these positions against accidental displacement. The hanger 21 besides having its loose sliding connection from the bearing-plates 20 may swing as a crank so as to allow of forward and rearward movements of the evener-bar and also upward and downward movements thereof.

The evener-bar at its middle portion is connected by means of a pair of chains 30 with the axle 12 near its ends, the chains usually connecting with the clamps 15, as shown, and the connection between the chains and the evener-bar is preferably made by means of a clevis 31, whose connecting-bolt 32 is slotted at its end and has a stop 33, slidable in such a manner upon a pin 34, connecting its furcate portions, that it may stand approximately at right angles to the bolt, as shown in Fig. 8, and thus prevent the removal of the bolt, or it may stand approximately in alinement with the bolt, as shown in Fig. 9, so as to permit of the free removal of the bolt. The stop 33 has the pin 34 passing through a longitudinal slot 35 thereof to permit the stop to slide and bring the pin to the rounded end of the stop, where said stop may hang in alinement with the bolt, as shown in Fig. 9, or to bring the pin near the other end of the stop, where the end of the slot is sufficiently distant from the end of the stop to cause the stop to be held approximately horizontal, as shown in Fig. 8, the slot being slightly offset at this end to prevent the stop riding on the pin accidentally.

In the modification shown in Fig. 6 the bearings 20' on the hounds for the evener-bar hanger instead of being in the shape of an elongated loop, as in the construction above described, are of a U shape, terminating in upstanding ends 35 to limit the sliding movement of the hanger 21 thereon, while in the modified form shown in Fig. 7 the corresponding bearing-plates 20'' are merely flat strips, and the bolts 36 securing them to the hounds have their heads projecting above the bearing-plate to constitute means for accomplishing the same purpose.

The evener-bar mounted in accordance with this invention is entirely free to move in different directions to compensate for inequalities in the draft. Furthermore, by locating the bearings for the evener-bar hangers above the hounds instead of beneath them the evener-bar may be brought closer to the hounds, for it is not necessary to provide for a bracket or bearing-loop between them.

Another advantageous feature of this invention is the means by which the evener-bar is made quickly removable to enable the horses of one vehicle to assist those of another vehicle, it being only necessary to lift the stop 24 and swing it back out of the path of the hanger 21, so that the evener-bar may be moved off of the ends of the hanger and to disconnect the evener-bar from the chains 30 by merely sliding the stop 33 through the clevis-bolt until it hangs in the position shown in Fig. 9, when the clevis-bolt may be withdrawn and the clevis removed. Obviously the parts may be reassembled with equal facility, and there is no liability of members becoming lost or misplaced.

The term "bearing-plate" as herein used is intended to have a broad meaning to include not only the forms shown in the drawings, but also such obvious substitutions as eyebolts and the like on the hounds through which the hanger may be fitted. Furthermore, the shoulders or stops at the ends of the bearing-plates may be dispensed with when desired and flat plates, as shown in Fig. 7, may be employed without the upwardly-projecting bolt-heads, the chains 30 being relied upon to keep the hanger in place.

What I claim as my invention is—

1. In a front gear for vehicles, a frame having hounds, bearing-plates on top of the hounds provided with shoulders at their ends forming stops, a hanger mounted on the bearing-plates and capable of moving between the stops, an evener-bar swinging from the hanger beneath the hounds, and means for connecting the evener-bar with the axle of the vehicle.

2. In a front gear for vehicles, a frame having hounds, bearing-plates on the hounds, a hanger mounted on the bearing-plates and capable of moving thereon, an evener-bar having means for releasably engaging the hanger whereby it is suspended beneath the hounds, means for preventing accidental disengagement of the hanger from the evener-bar, and means connecting the evener-bar with the axle of the vehicle.

3. In a front gear for vehicles, a frame having hounds, bearing-plates on the hounds, a hanger mounted on the bearing-plates and capable of moving thereon, said hanger having its ends projecting in the same direction to form engaging hooks, an evener-bar provided with eyes to receive the hooked ends of the hanger whereby the evener-bar is suspended beneath the hounds by means of the hanger, a movable stop adapted to stand in the path of one of the ends of the hanger and prevent its removal from the eye of the evener-bar, and means for connecting the evener-bar with the axle of the vehicle.

4. In a front gear for vehicles, a frame having hounds, bearing-plates on the hounds, a hanger mounted on the bearing-plates and capable of moving thereon, said hanger having its ends projecting in the same direction to form engaging hooks, an evener-bar provided with eyes to receive the hooked ends of the hanger whereby the evener is suspended beneath the hounds by means of the hanger, a pivoted stop on the evener-bar adapted in one position to stand in the path of the hanger and prevent its removal from the eyes of the evener-bar and adapted in another position to be removed from the path of the hanger so as to permit of its removal from the eyes of the evener-bar, means for holding the stop in its positions, and means for connecting the evener-bar with the axle of the vehicle.

5. In a front gear for vehicles, a frame having hounds, bearing-plates on the hounds, a hanger mounted on the bearing-plates and capable of moving thereon, said hanger having its ends projecting in the same direction to form engaging hooks, an evener-bar, brackets on the evener-bar provided with eyes for receiving the hooked ends of the hanger, projecting ears on one of the brackets, a pin connecting said ears, a stop pivotally mounted on the pin and adapted in one position to stand in the path of the hanger and prevent its removal from the eyes of the brackets, a spring pressing the catch toward one of the ears, and a rib-and-slot connection between said ear and the catch to hold the catch with pressure in the said position, and means for connecting the evener-bar with the axle of the vehicle.

6. In a front gear for vehicles, a frame having hounds, bearing-plates on top of the hounds with their ends bent upwardly to constitute shoulders or stops, a hanger mounted on the bearing-plates and capable of moving between the stops, an evener-bar swinging from the hanger beneath the hounds, and means for connecting the evener-bar with the axle of the vehicle.

7. In a front gear for vehicles, a frame having hounds, bearing-plates on top of the hounds comprising elongated horizontal loops with their ends forming shoulders or stops, a hanger mounted in the loops of the bearing-plates and capable of moving between the stops, an evener-bar swinging from the hanger beneath the hounds, and means for connecting the evener-bar with the axle of the vehicle.

8. In a front gear for vehicles, a frame having hounds, bearing-plates on top of the hounds, a hanger mounted on the bearing-plates, an evener-bar swinging from the hanger beneath the hounds, and means for connecting the evener-bar with the axle of the vehicle.

9. In a front gear for vehicles, a frame having hounds, bearing-plates on top of the hounds, a hanger mounted on the bearing-plates and capable of moving thereon, an evener-bar detachably connected to the hanger and suspended thereby beneath the hounds, a clevis having a bolt connecting it with the evener-bar, said bolt being provided with a slidable stop capable of a position approximately at right angles to the bolt and of another position in alinement with the bolt, and chains connecting the clevis with the axle of the vehicle.

In testimony whereof I affix my signature in presence of two witnesses.

CHARLES G. STREICH.

Witnesses:
R. S. C. CALDWELL,
ANNA F. SCHMIDTBAUER,